United States Patent [19]

Yamamoto

[11] Patent Number: 5,611,510
[45] Date of Patent: Mar. 18, 1997

[54] DEVICE FOR FITTING UP AN AUXILIARY LAMP

[75] Inventor: Teruaki Yamamoto, Tokyo, Japan

[73] Assignee: PIAA Corporation, Tokyo, Japan

[21] Appl. No.: 386,497

[22] Filed: Feb. 10, 1995

[51] Int. Cl.$^6$ .................................................... A47G 1/17
[52] U.S. Cl. ............................. 248/205.3; 248/291.1; 248/467; 248/479; 362/82; 362/83; 362/83.3; 362/269; 362/427
[58] Field of Search .......................... 248/205.3, 291.1, 248/467, 479, 485; 362/80, 82, 83, 83.3, 269, 427

[56] References Cited

U.S. PATENT DOCUMENTS

| | | | |
|---|---|---|---|
| 1,210,146 | 12/1916 | Canfield | 362/427 X |
| 3,204,524 | 9/1965 | Moore, Jr. | 248/485 X |
| 4,714,223 | 12/1987 | Kamaya | 248/291.1 |
| 4,747,679 | 5/1988 | Beach, Jr. | 248/479 |
| 4,925,286 | 5/1990 | Cutburth | 248/485 X |
| 5,026,028 | 6/1991 | Ooi et al. | 248/291.1 X |
| 5,074,508 | 12/1991 | Powers | 248/291.1 |
| 5,111,342 | 5/1992 | Quesada | 248/467 X |

*Primary Examiner*—Leslie A. Braun
*Assistant Examiner*—Richard M. Smith
*Attorney, Agent, or Firm*—Hazel & Thomas, P.C.

[57] ABSTRACT

A device for fitting up an auxiliary lamp of the present invention includes a pair of brackets 2 opposite to each other and projecting from an auxiliary lamp body 1, a support plate 4 having one side surface adhered to a surface of an automobile, pivot members 5 for projecting from another side surface of the support plate 4 to be fitted loosely between the brackets 2, pivot members 5 interposing washer and nut members 6 and 7, arcuate members 8 and 9 on both sides of the brackets 2, arcuate members 10 and 11 at the surface of the washer and nut members 6 and 7, respectively, and the pivot, washer and nut members 5, 6 and 7 and brackets 2 that have a horizontally elongate recess 12, a through hole 13, a tapped hole 14 and a through hole 15 at the center, respectively and that are engaged by a bolt 16. Thereby, an illumination direction of an auxiliary lamp can be easily adjusted in the vertical or horizontal directions after the auxiliary lamp has been fitted to an automobile by an adhesive.

1 Claim, 2 Drawing Sheets

DEVICE FOR FITTING UP AN AUXILIARY LAMP

SUMMARY OF THE INVENTION

This invention relates to a device for fitting an auxiliary lamp, in particular a fog lamp, to an automobile.

Many late-model automobiles do not have bumpers. If any, the bumper has an inconvenient shape on which to fit an auxiliary lamp. The latest technological improvements in adhesives have resulted in a class of adhesives resistant to the vibration of automobiles, even if used for gluing two components together.

Therefore, when such an adhesive is used, an auxiliary lamp can be glued to any part of an automobile or its bumper. However, if a lamp is glued in an incorrect position for appropriate illumination, that position can not be corrected.

One of the purposes of this invention is to permit an erroneous fitting position to be easily corrected after an auxiliary lamp has been fitted to an automobile by an adhesive.

This invention is to provide a structure in which an illuminating angle of an lamp can be adjusted in the horizontal and vertical directions relative to support plate of an automobile lamp body 1 containing an auxiliary lamp for gluing to be mounted to a suitable position on an automobile.

PREFERRED EMBODIMENTS OF THE INVENTION

Referring to the accompanying drawings, 1 denotes an auxiliary lamp, body in which an auxiliary lamp such as a fog lamp, is contained. 4 denotes a supporting plate thereof. While the auxiliary lamp body 1 is shown as being suspended from the support plate 4 as the auxiliary lamp would be along its positioned back side on the front part of an automobile, the body may also be supported above the support plate as if the auxiliary lamp were to be positioned on an automobile roof.

2 denotes a pair of bracket members projecting from the upper surface of said auxiliary lamp body 1. They each have a horizontal through hole 15. 3 denotes an adhesive layer.

Figure 1:
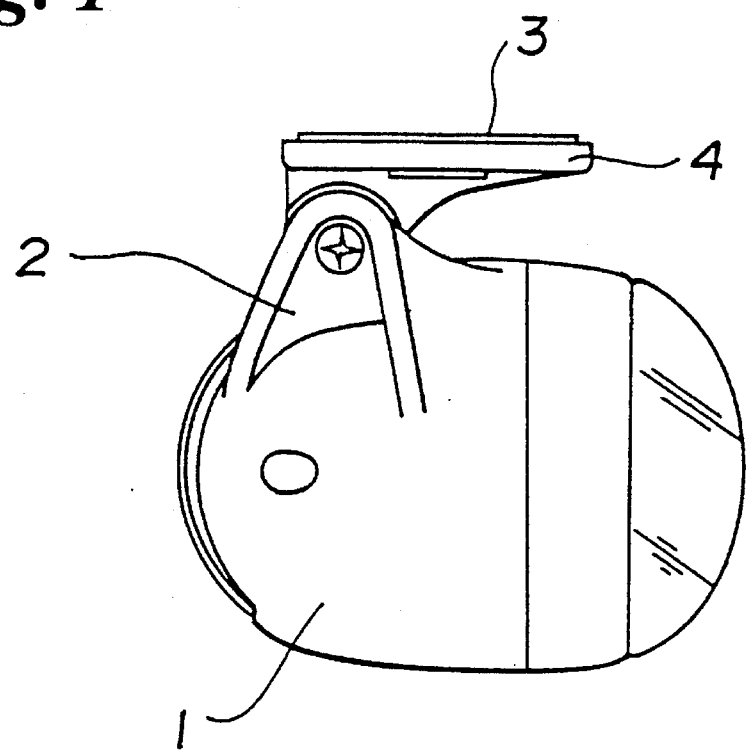
FIG. 1 and 2 are side and front views of a device for fitting up an auxiliary lamp.
Figure 2:
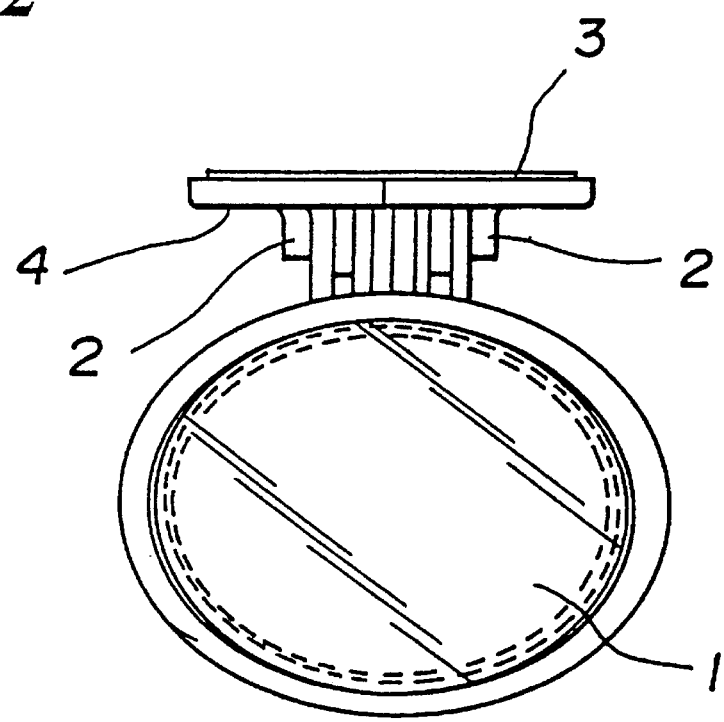
Figure 3:
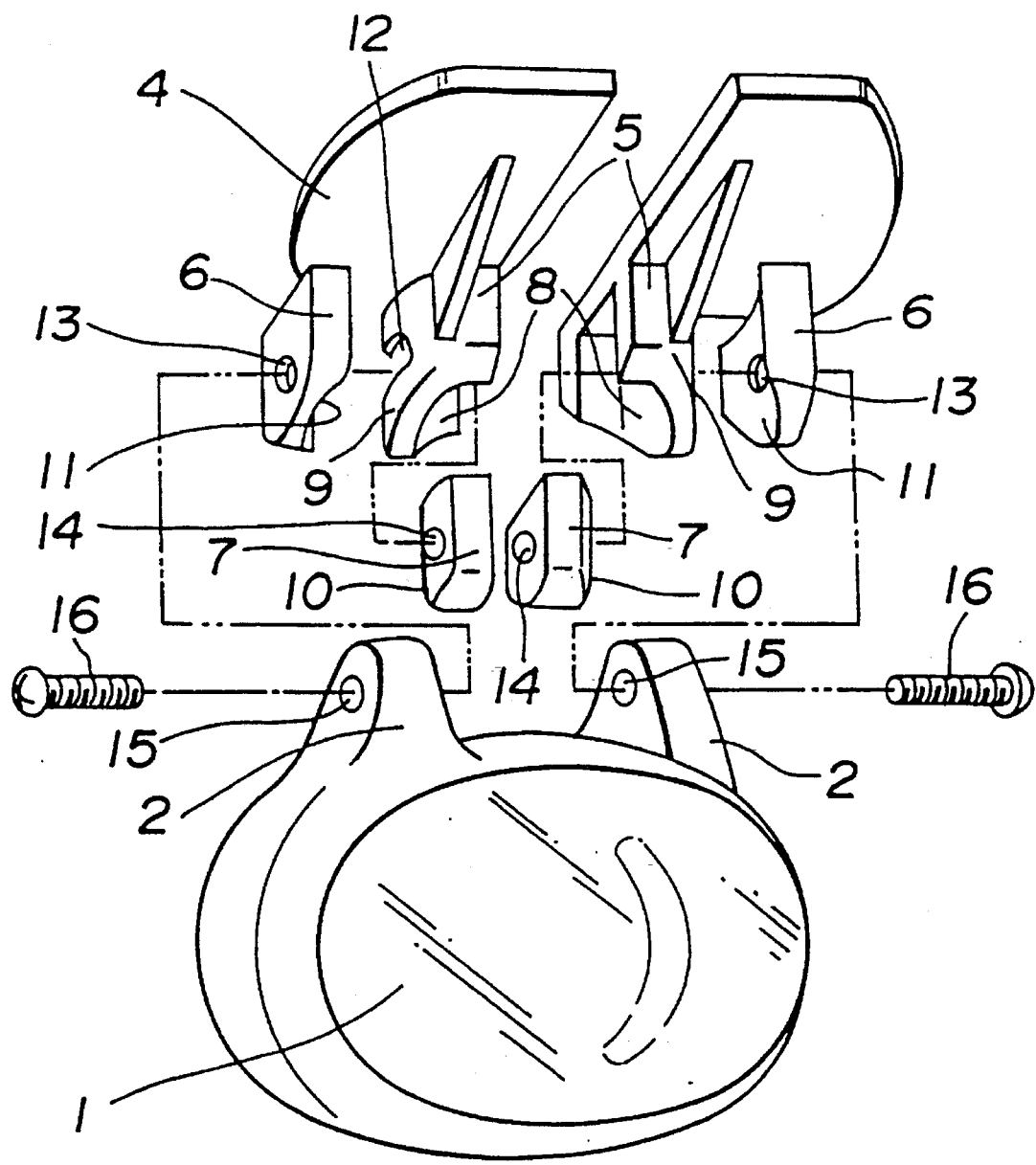
FIG. 3 is an exploded perspective view of a device for fitting an auxiliary lamp.

4 denotes a support plate which may be formed by one single flat plate or two semicircular flat plates arranged horizontally, as shown in FIG. 3.

The support plate 4 has a pair of pivot members 5 projecting downwards and loosely fitted into the brackets 2 of said auxiliary lamp body 1. The pivot members 5 each have a horizontal elongate recess 12 and the opposite surfaces 8 and 9 in an arcuate form.

A pair of washer members 6 are interposed between the brackets 2 of the auxiliary lamp body 1 and the pivot members 5 of the support plate 4. The washer members 6 each have a through hole 13 at the center and a surface to be in contact with the support plate 4. The washer members 6 are each formed in an arcuate shape 11 to be fitted with the inner surface of the support plate 4.

A pair of nut members 7 extends along the inner surface of the pivot members 5. The nut members 7 each have a tapped hole (14) bored at the center position and surfaces to be in contact with the pivot members 5. The surfaces are formed in an arcuate shape 10 to be fitted with the inner surface of the pivot members.

A pair of bolts 16 are threaded into corresponding tapped holes 14 of the nut member 7 through the through holes 15 of corresponding brackets 2 on the auxiliary lamp body 1, corresponding through holes 13 of the washer members 6 and corresponding elongate recesses 12 of the pivot members 5.

Thereby, an adhesive is applied to the upper surface of said support plate 4 by a suitable means, such as the adhesive layer 3, and the support plate 4 is adhered to an underside surface of an automobile such as the bumper or the like, thus suspending the auxiliary lamp body 1 from the automobile.

If the direction of the auxiliary lamp body 1 or the illuminating position has to be changed after the upper surface of said support plate 4 is glued to the underside surface of the automobile, the auxiliary lamp body 1 can be adjusted in the vertical direction by loosening said bolt 16. Specifically, the inner surface of the brackets 2 in the auxiliary lamp body 1 and the outer surface of the washer members 6 are in contact with one another along flat, smooth-shaped surfaces, enabling the auxiliary lamp body 1 to be pivoted in the vertical direction.

Furthermore, if the auxiliary lamp body 1 were designed to be moved in the horizontal direction, the auxiliary lamp body 1 can be pivoted horizontally.

In this case the pivot members 5 have arcuate surfaces 8 and 9 along their inner and outer surfaces, respectively. The washer and nut members 6 and 7 in contact have the outer and inner surfaces which are formed as arcuate surfaces 10 and 11. This enables the auxiliary lamp body 1 to be smoothly pivoted horizontally. The auxiliary lamp body 1 is guided with the bolts 16 in the elongate recesses 12 of the pivot members 15, permitting horizontal adjustment of the auxiliary lamp body 1.

A device for fitting up an auxiliary lamp according to the invention allows an auxiliary lamp to be adjusted vertically and horizontally to a correct position when the illuminating position of an auxiliary lamp glued to an automobile has been set incorrectly.

What is claimed is:

1. A device for fitting up an auxiliary lamp, comprising:

an auxiliary lamp body containing a fog lamp or other kind of auxiliary lamp;

a pair of brackets opposite to each other, and projecting from one side of the lamp body;

a support plate having one side surface fitted adhesively at a suitable position by an adhesive layer; and a pair of pivot members projecting from another side surface of said support plate and loosely fitted between the brackets, each of said pivot members being interposed between a washer member and a nut member, said pivot members each having inner and outer arcuate surfaces, said washers having inner arcuate surfaces which match said pivot member outer arcuate surfaces, said nut members having outer arcuate surfaces which match said pivot member inner arcuate surfaces, said pivot members having horizontally elongate recesses, said washers having through holes, said nut members having tapped holes, said brackets having center through holes, and a pair of bolts for engaging each of said pivot member recesses, said washer holes, said nut member holes, and said bracket holes.

* * * * *